US010233357B2

(12) United States Patent
Ando

(10) Patent No.: US 10,233,357 B2
(45) Date of Patent: *Mar. 19, 2019

(54) POLISHING COMPOSITION FOR MAGNETIC DISC SUBSTRATE

(71) Applicant: YAMAGUCHI SEIKEN KOGYO CO., LTD., Aichi (JP)

(72) Inventor: Junichiro Ando, Aichi (JP)

(73) Assignee: YAMAGUCHI SEIKEN KOGYO CO., LTD. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/590,787

(22) Filed: May 9, 2017

(65) Prior Publication Data

US 2017/0321086 A1 Nov. 9, 2017

(30) Foreign Application Priority Data

May 9, 2016 (JP) .................. 2016-093805

(51) Int. Cl.
C09G 1/02 (2006.01)
C09G 1/06 (2006.01)
C09K 3/14 (2006.01)
C08F 220/54 (2006.01)
C08F 220/56 (2006.01)
G11B 5/84 (2006.01)

(52) U.S. Cl.
CPC .............. C09G 1/06 (2013.01); C08F 220/54 (2013.01); C08F 220/56 (2013.01); C09G 1/02 (2013.01); C09K 3/1409 (2013.01); C09K 3/1463 (2013.01); G11B 5/8404 (2013.01)

(58) Field of Classification Search
None
See application file for complete search history.

(56) References Cited

U.S. PATENT DOCUMENTS

| 6,309,434 B1* | 10/2001 | Ohashi | C09G 1/02 106/3 |
| 6,332,831 B1* | 12/2001 | Shemo | C09G 1/02 106/3 |
| 6,620,216 B2 | 9/2003 | Oshima et al. | |
| 7,531,600 B1* | 5/2009 | Rey | C02F 1/56 210/698 |
| 2003/0022987 A1* | 1/2003 | Matz | A61K 8/8158 524/814 |
| 2004/0010979 A1 | 1/2004 | Oshima et al. | |
| 2006/0112647 A1* | 6/2006 | Fujii | B24B 37/042 51/295 |
| 2009/0275268 A1* | 11/2009 | Ishida | B24B 37/042 451/41 |
| 2010/0155654 A1* | 6/2010 | Etoh | C09G 1/02 252/79.1 |
| 2010/0221417 A1* | 9/2010 | Miyamoto | C11D 1/62 427/129 |
| 2011/0203186 A1 | 8/2011 | Oshima et al. | |
| 2011/0245127 A1* | 10/2011 | Suzuki | C11D 1/008 510/163 |
| 2014/0335763 A1 | 11/2014 | Oshima et al. | |

FOREIGN PATENT DOCUMENTS

| JP | 2009-120850 A | 6/2009 |
| JP | 2009-172709 A | 8/2009 |
| JP | 2010-170650 A | 8/2010 |

* cited by examiner

Primary Examiner — Shamim Ahmed
(74) Attorney, Agent, or Firm — Bracewell LLP; Brad Y. Chin

(57) ABSTRACT

Embodiments provide a polishing composition for a magnetic disc substrate including colloidal silica, a phosphorus-containing compound, a water-soluble polymer compound, and water. According to at least one embodiment, the water-soluble polymer compound is a copolymer having a structural unit derived from an unsaturated aliphatic carboxylic acid and a structural unit derived from an unsaturated amide.

12 Claims, No Drawings

POLISHING COMPOSITION FOR MAGNETIC DISC SUBSTRATE

CROSS REFERENCE TO RELATED APPLICATIONS

This application claims the benefit of and priority to Japanese Patent Application No. JP-2016-93805 filed on May 9, 2016, with Japanese Patent Office, the entire contents of which are incorporated herein by reference.

BACKGROUND

Field

Embodiments relate to a polishing composition used for polishing an electronic component such as a magnetic recording medium including a hard disc. Particularly, embodiments relate to a polishing composition for a magnetic disc substrate used for polishing a surface of a substrate for a magnetic recording medium such as a glass magnetic disc substrate or an aluminum magnetic disc substrate. Furthermore, embodiments relate to a polishing composition for a magnetic disc substrate preferably used for finish polishing of an aluminum magnetic disc substrate for a magnetic recording medium, having an electroless nickel-phosphorus plated film formed on a surface of an aluminum alloy substrate.

Description of the Related Art

Conventionally, as a polishing composition for polishing a surface of an electroless nickel-phosphorus plated film of an aluminum magnetic disc substrate, improvement of various polishing characteristics has been desired in order to improve a magnetic recording density. For example, as for a scratch, a scratch portion may cause an error in writing or reading, or burr generated around a scratch may cause head crash or the like.

Therefore, colloidal silica has come to be used for finish polishing of an aluminum magnetic disc substrate as an abrasive grain component playing a role of mechanical polishing of a polishing composition from a viewpoint of reduction in scratches. At this time, in industrial polishing, an abrasive grain component playing a role of mechanical polishing of a polishing composition and a chemical component playing a role of chemical polishing are mixed immediately before actual polishing to be used in many cases.

However, when colloidal silica as an abrasive grain component and a chemical component are mixed, the colloidal silica tends to be aggregated. Therefore, a method for setting the pH of a polishing composition within a strong acid region which is a metastable state of colloidal silica, suppressing aggregation of colloidal silica to some extent, and removing an aggregate still generated with a filter is general in finish polishing. A filter opening tends to be smaller with higher quality request. Due to such a circumstance, an object in finish polishing has been to develop a method for suppressing aggregation of colloidal silica.

Meanwhile, a trial to reduce scratches has been performed by removing a coarse particle or an aggregated particle, adjusting the shape of a particle, or adjusting corrosiveness of a polishing agent. For example, adjustment of corrosiveness of a polishing agent (see, for example, JP-A-2009-120850), adjustment of the shape of a particle (see, for example, JP-A-2009-172709), and adjustment of the content of an aggregated particle (see, for example, JP-A-2010-170650) have been proposed.

SUMMARY

However, the level of a scratch to be improved has become smaller and shallower, and the above countermeasure is insufficient therefor. In addition, an object is also to suppress aggregation of colloidal silica.

According to at least one embodiment, on object is to provide a polishing composition for a magnetic disc substrate for suppressing aggregation of colloidal silica and reducing scratches in a polished substrate. In addition, a polishing rate is lowered due to contamination of a polishing pad or the like after polishing many times. Therefore, an object of at least one embodiment is also to solve a problem of reduction in productivity.

In order to solve the above problem, intensive studies were made. As a result, by using the following polishing composition for a magnetic disc substrate, reduction in scratches and suppression of lowering of a polishing rate after polishing many times have been achieved with aggregation of colloidal silica suppressed, and the various embodiments have been achieved.

According to at least one embodiment, there is provided a polishing composition for a magnetic disc substrate containing colloidal silica, a phosphorus-containing compound, a water-soluble polymer compound, and water, in which the water-soluble polymer compound is a copolymer containing a structural unit derived from an unsaturated aliphatic carboxylic acid and a structural unit derived from an unsaturated amide.

According to at least one embodiment, the colloidal silica has an average particle size (D50) of 1 to 100 nm and a concentration of 1 to 50% by mass in the composition.

According to at least one embodiment, the water-soluble polymer compound is a copolymer having a molar ratio of 95:5 to 5:95 between the structural unit derived from an unsaturated aliphatic carboxylic acid and the structural unit derived from an unsaturated amide.

According to at least one embodiment, the unsaturated amide is N-alkylacrylamide or N-alkylmethacrylamide.

According to at least one embodiment, the copolymer is selected from the group consisting of a copolymer of acrylic acid and/or a salt thereof and N-alkylacrylamide, a copolymer of acrylic acid and/or a salt thereof and N-alkylmethacrylamide, a copolymer of methacrylic acid and/or a salt thereof and N-alkylacrylamide, and a copolymer of methacrylic acid and/or a salt thereof and N-alkylmethacrylamide.

According to at least one embodiment, the water-soluble polymer has a weight average molecular weight of 500 to 50,000.

According to at least one embodiment, the water-soluble polymer has a concentration of 0.0001 to 2.0% by mass.

According to at least one embodiment, the phosphorus-containing compound is at least one selected from the group consisting of an inorganic phosphorus compound and an organic phosphonic acid and/or a salt thereof.

According to at least one embodiment, the inorganic phosphorus compound is at least one selected from the group consisting of phosphoric acid, phosphonic acid, phosphinic acid, pyrophosphoric acid, tripolyphosphoric acid, and salts thereof.

According to at least one embodiment, the organic phosphonic acid and/or a salt thereof is at least one selected from the group consisting of 2-aminoethyl phosphonic acid, 1-hydroxyethylidene-1,1-diphosphonic acid, aminotri(methylene phosphonic acid), ethylene diaminetetra(methylene phosphonic acid), diethylene triaminepenta(methylene phosphonic acid), ethane-1,1-diphosphonic acid, ethane-1,1,2-triphosphonic acid, ethane-1-hydroxy-1,1,2-triphosphonic acid, ethane-1,2-dicarboxy-1,2-diphosphonic acid, methanehydroxy phosphonic acid, 2-phosphonobutane-1,2-dicarboxylic acid, 1-phosphonobutane-2,3,4-tricarboxylic acid, α-methyl phosphono succinic acid, and salts thereof.

According to at least one embodiment, the polish composition further includes a surfactant having a repeating unit and a sulfonic acid (salt) group in a molecule thereof and having an aromatic group in a main chain of the repeating unit.

According to at least one embodiment, the surfactant contains at least one selected from the group consisting of a naphthalenesulfonic acid compound, a ligninsulfonic acid compound, an aromatic aminosulfonic acid compound, and salts thereof.

According to at least one embodiment, the naphthalenesulfonic acid compound is at least one selected from the group consisting of a naphthalenesulfonic acid formaldehyde condensate, a methyl naphthalenesulfonic acid formaldehyde condensate, and salts thereof.

According to various embodiments, the polishing composition for a magnetic disc substrate causes colloidal silica to be not easily aggregated, improves a polishing efficiency, and can reduce scratches after polishing. Furthermore, the polishing composition, according to various embodiments, causes a polishing rate to be not easily lowered after polishing many times.

DETAILED DESCRIPTION

Hereinafter, various embodiments will be described. The present invention is not limited to the following embodiments, but changes, modifications, and improvements can be added thereto as long as not departing from the scope of the various embodiments.

1. Polishing Composition

The polishing composition for a magnetic disc substrate according to at least one embodiment contains colloidal silica, a phosphorus-containing compound, a water-soluble polymer compound, and water.

(1) Water-Soluble Polymer Compound

A water-soluble polymer compound according to at least one embodiment is a copolymer having a structural unit derived from an unsaturated aliphatic carboxylic acid and a structural unit derived from an unsaturated amide. Thus, the water-soluble polymer compound is a polymer obtained by copolymerizing an unsaturated aliphatic carboxylic acid and/or a salt thereof and an unsaturated amide as essential monomers. Thus, the water-soluble polymer compound according to at least one embodiment is a polymer having a structural unit derived from an unsaturated aliphatic carboxylic acid and a structural unit derived from an unsaturated amide as essential structural units.

(1-1) Unsaturated Aliphatic Carboxylic Acid

Examples of the unsaturated aliphatic carboxylic acid and a salt thereof include acrylic acid, methacrylic acid, maleic acid, itaconic acid, and salts thereof.

At least a part of structural units derived from an unsaturated aliphatic carboxylic acid may be included in the water-soluble polymer compound as a carboxylate. Examples of the carboxylate include sodium carboxylate, potassium carboxylate, magnesium carboxylate, ammonium carboxylate, amine carboxylate, and alkylammonium carboxylate.

In order to cause a structural unit derived from an unsaturated aliphatic carboxylic acid to be included in the water-soluble polymer compound as carboxylic acid, an unsaturated aliphatic carboxylic acid may be polymerized as a monomer, or an unsaturated aliphatic carboxylate may be polymerized as a monomer and then the resulting polymer may be converted into carboxylic acid by cation exchange. In addition, in order to cause a structural unit derived from an unsaturated aliphatic carboxylic acid to be included in the water-soluble polymer compound as a carboxylate, an unsaturated aliphatic carboxylate may be polymerized as a monomer, or an unsaturated aliphatic carboxylic acid may be polymerized as a monomer and then the resulting polymer may be neutralized with a base to form a carboxylate.

In order to evaluate a ratio between a structural unit included as carboxylic acid and a structural unit included as a carboxylate in a water-soluble compound, a pH value of the water-soluble polymer compound can be used. When the pH value of the water-soluble polymer compound is low, the ratio of the structural unit included as carboxylic acid can be evaluated to be high. On the other hand, when the pH value of the water-soluble polymer compound is high, the ratio of the structural unit included as a carboxylate can be evaluated to be high. According to at least one embodiment, for example, a water-soluble polymer compound having a pH value (25° C.) of 1 to 13 in a water-soluble polymer compound aqueous solution having a concentration of 10% by mass can be used.

(1-2) Unsaturated Amide

As an unsaturated amide, α,β-ethylenic unsaturated amide is preferably used. More specific examples thereof include an α,β-ethylenic unsaturated carboxylic acid amide such as acrylamide, methacrylamide, N-alkylacrylamide, or N-alkylmethacrylamide.

More preferable examples thereof include N-alkylacrylamide and N-alkylmethacrylamide. Preferable specific examples of N-alkylacrylamide, N-alkylmethacrylamide, and the like include N-methylacrylamide, N-ethylacrylamide, N-n-propylacrylamide, N-iso-propylacrylamide, N-n-butylacrylamide, N-iso-butylacrylamide, N-sec-butylacrylamide, N-tert-butylacrylamide, N-methylmethacrylamide, N-ethylmethacrylamide, N-n-propylmethacrylamide, N-iso-propylmethacrylamide, N-n-butylmethacrylamide, N-iso-butylmethacrylamide, N-sec-butylmethacrylamide, and N-tert-butylmethacrylamide. Among these compounds, N-n-butylacrylamide, N-iso-butylacrylamide, N-sec-butylacrylamide, N-tert-butylacrylamide, N-n-butylmethacrylamide, N-iso-butylmethacrylamide, N-sec-butylmethacrylamide, and N-tert-butylmethacrylamide are particularly preferable.

(1-3) Copolymer

The water-soluble polymer compound according to at least one embodiment is preferably a copolymer obtained by combining and polymerizing these monomer components. Preferable examples of a combination of copolymerization include a combination of acrylic acid and/or a salt thereof and N-alkylacrylamide, a combination of acrylic acid and/or a salt thereof and N-alkylmethacrylamide, a combination of methacrylic acid and/or a salt thereof and N-alkylacrylamide, and a combination of methacrylic acid and/or a salt thereof and N-alkylmethacrylamide. Among these combinations, a combination in which an alkyl group in N-alkylacrylamide or N-alkylmethacrylamide is at least one selected from the group consisting of a n-butyl group, an iso-butyl group, a sec-butyl group, and a tert-butyl group is particularly preferably used.

A molar ratio between a structural unit derived from an unsaturated aliphatic carboxylic acid and a structural unit derived from an unsaturated amide in the water-soluble polymer compound is preferably from 95:5 to 5:95, and more preferably from 90:10 to 10:90.

(1-4) Method for Manufacturing Water-Soluble Polymer Compound

A method for manufacturing a water-soluble polymer compound, according to at least one embodiment, is not particularly limited, but an aqueous solution polymerization method is preferable. According to aqueous solution polymerization, a water-soluble polymer compound as a uniform solution can be obtained.

A polymerization liquid medium in the aqueous solution polymerization is preferably an aqueous liquid medium, and is particularly preferably water. In order to improve solubility of the above monomer components in a liquid medium, an organic liquid medium may be added appropriately in a range not having a bad influence on polymerization of the monomers. Examples of the above organic liquid medium include an alcohol such as isopropyl alcohol and a ketone such as acetone. These liquid media can be used singly or in combination of two or more kinds thereof.

Hereinafter, a method for manufacturing a water-soluble polymer compound, according to at least one embodiment, using the above aqueous liquid medium will be described. In a polymerization reaction, a known polymerization initiator can be used, but a radical polymerization initiator is particularly preferably used.

Examples of the radical polymerization initiator include a persulfate such as sodium persulfate, potassium persulfate, or ammonium persulfate, a hydroperoxide such as t-butyl hydroperoxide, a water-soluble peroxide such as hydrogen peroxide, a ketone peroxide such as methylethyl ketone peroxide or cyclohexanone peroxide, an oil-soluble peroxide such as dialkyl peroxide including di-t-butyl peroxide and t-butyl cumyl peroxide, and an azo compound such as azobisisobutyronitrile or 2,2-azobis(2-methylpropionamidine) dihydrochloride. These peroxide-based radical polymerization initiators may be used singly or in combination of two or more kinds thereof.

Among the above peroxide-based radical polymerization initiators, a persulfate or an azo compound is preferable, and azobisisobutyronitrile is particularly preferable because of easy control of a molecular weight of a generated water-soluble polymer compound.

The use amount of the above radical polymerization initiator is not particularly limited, but is preferably from 0.1 to 15% by mass, and particularly preferably from 0.5 to 10% by mass based on the total mass of all the monomers of a water-soluble polymer compound. By setting this ratio to 0.1% by mass or more, a copolymerization ratio can be improved. By setting this ratio to 15% by mass or less, stability of a water-soluble polymer compound can be improved.

In some cases, a water-soluble polymer compound, according to at least one embodiment, can be manufactured using a water-soluble redox-based polymerization initiator. Examples of the redox-based polymerization initiator include a combination of an oxidizer (for example, the above peroxide) and a reducing agent such as sodium bisulfite, ammonium bisulfite, sodium sulfite, or sodium hydrosulfite, iron alum, potassium alum, or the like.

In manufacturing a water-soluble polymer compound, according to at least one embodiment, a chain transfer agent may be added appropriately to a polymerization system in order to adjust a molecular weight. Examples of the chain transfer agent include sodium phosphite, sodium hypophosphite, potassium hypophosphite, sodium sulfite, sodium hydrogen sulfite, mercaptoacetic acid, mercaptopropionic acid, thioglycolic acid, 2-propanethiol, 2-mercaptoethanol, and thiophenol.

A polymerization temperature for manufacturing a water-soluble polymer compound, according to at least one embodiment, is not particularly limited, but is preferably from 60 to 100° C. By setting the polymerization temperature to 60° C. or higher, a polymerization reaction proceeds smoothly to obtain excellent productivity. By setting the polymerization temperature to 100° C. or lower, coloring can be suppressed.

In addition, the polymerization reaction can be performed under an increased or reduced pressure, but is preferably performed at a normal pressure because of cost of equipment for a reaction under an increased or reduced pressure. Polymerization time is preferably from 2 to 20 hours, and is particularly preferably about from 3 to 10 hours.

After the polymerization reaction, neutralization is performed with a basic compound, as necessary. Examples of the basic compound used for neutralization include an alkali metal hydroxide such as sodium hydroxide or potassium hydroxide, an alkaline earth metal hydroxide such as calcium hydroxide or magnesium hydroxide, ammonia water, and an organic amine such as monoethanol amine, diethanol amine, or triethanol amine. Among these compounds, ammonia water is preferable in view of dispersibility of a water-soluble polymer compound generated and avoiding contamination of a substrate to be polished. In an aqueous solution having a water-soluble polymer compound concentration of 10% by mass, the pH value (25° C.) after neutralization is preferably from 2 to 9, and more preferably from 3 to 8.

(1-5) Weight Average Molecular Weight

The weight average molecular weight of a water-soluble polymer compound is preferably 500 or more and 50,000 or less, and more preferably 1,000 or more and 30,000 or less. The weight average molecular weight of a water-soluble polymer compound is measured in terms of polyacrylic acid by gel permeation chromatography (GPC).

(1-6) Concentration

The concentration of a water-soluble polymer compound in the polishing composition is preferably 0.0001% by mass or more and 2.0% by mass or less, more preferably 0.001% by mass or more and 1.0% by mass or less, still more preferably 0.005% by mass or more and 0.5% by mass or less, and particularly preferably 0.01% by mass or more and 0.3% by mass or less in terms of a solid content.

(2) Colloidal Silica

Colloidal silica according to at least one embodiment preferably has an average particle size (D50) of 1 to 100 nm.

The average particle size is more preferably from 2 to 80 nm. Colloidal silica is obtained by a water glass process for growing a particle by a condensation reaction of an alkali metal silicate such as sodium silicate or potassium silicate as a raw material in an aqueous solution. Alternatively, for example, colloidal silica is obtained by an alkoxysilane method for growing a particle by an acid or alkali hydrolysis condensation reaction of an alkoxysilane such as tetraethoxy silane as a raw material in water containing a water-soluble organic liquid medium such as an alcohol.

As the shape of colloidal silica, a spherical shape, a chain-like shape, a kompeito-typed shape (like particles having convexes on the surface), a heteromorphic shape, or the like is known, and primary particles are monodispersed in water to form a colloid shape. As the colloidal silica used in various embodiments, spherical or approximately spherical colloidal silica is particularly preferable. Scratches can be reduced by using spherical or approximately spherical colloidal silica.

The concentration of colloidal silica in the polishing composition is preferably from 1 to 50% by mass. The concentration is more preferably from 2 to 40% by mass.

(3) Acid and/or Salt Thereof

According to at least one embodiment, an acid and/or a salt thereof can be used for pH adjustment or as an optional component.

Examples of the acid and/or a salt thereof to be used include an inorganic acid and/or a salt thereof and an organic acid and/or a salt thereof. Examples of the inorganic acid and/or a salt thereof include an inorganic acid such as nitric acid, sulfuric acid, hydrochloric acid, phosphoric acid, phosphonic acid, phosphinic acid, pyrophosphoric acid, or tripolyphosphoric acid, and/or salts thereof. Examples of the organic acid and/or a salt thereof include an aminocarboxylic acid such as glutamic acid or aspartic acid, and/or salts thereof, and a carboxylic acid such as citric acid, tartaric acid, oxalic acid, nitroacetic acid, maleic acid, malic acid, or succinic acid, and/or salts thereof. These acids and/or salts thereof can be used singly or in combination of two or more kinds thereof.

(4) Phosphorus-Containing Compound

The phosphorus-containing compound according to at least one embodiment is preferably at least one selected from the group consisting of an inorganic phosphorus compound and an organic phosphonic acid and/or a salt thereof.

Examples of the inorganic phosphorus compound include an inorganic acid such as phosphoric acid, phosphonic acid, phosphinic acid, pyrophosphoric acid, or tripolyphosphoric acid, and salts thereof.

The organic phosphonic acid and/or a salt thereof is at least one selected from the group consisting of 2-aminoethyl phosphonic acid, 1-hydroxyethylidene-1,1-diphosphonic acid, aminotri(methylene phosphonic acid), ethylene diaminetetra(methylene phosphonic acid), diethylene triaminepenta(methylene phosphonic acid), ethane-1,1-diphosphonic acid, ethane-1,1,2-triphosphonic acid, ethane-1-hydroxy-1,1,2-triphosphonic acid, ethane-1,2-dicarboxy-1,2-diphosphonic acid, methanehydroxy phosphonic acid, 2-phosphonobutane-1,2-dicarboxylic acid, 1-phosphonobutane-2,3,4-tricarboxylic acid, α-methyl phosphono succinic acid, and salts thereof.

Use of a combination of two or more kinds of the above compounds is also an embodiment. Specific examples thereof include a combination of phosphoric acid and organic phosphonic acid and a combination of phosphoric acid and an organic phosphonate.

The concentration of a phosphorus-containing compound in the polishing composition is preferably from 0.1 to 20% by mass. The concentration is more preferably from 0.2 to 10% by mass. The concentration of a phosphorus-containing compound of 0.1% by mass or more reduces a frequency of filter replacement in finish polishing to improve productivity in polishing. The concentration of a phosphorus-containing compound of 20% by mass or less can maintain sufficient polishing performance without using a phosphorus-containing compound in an excessive amount.

(5) Oxidizer

According to at least one embodiment, an oxidizer can be used as a polishing accelerator. Examples of the oxidizer used include peroxide, permanganic acid or a salt thereof, chromic acid or a salt thereof, peroxoacid or a salt thereof, halogen oxoacid or a salt thereof, oxoacid or a salt thereof, and a mixture of two or more kinds of these oxidizers.

Specific examples thereof include hydrogen peroxide, sodium peroxide, barium peroxide, potassium permanganate, a metal salt of chromic acid, a metal salt of dichromic acid, persulfuric acid, sodium persulfate, potassium persulfate, ammonium persulfate, peroxophosphonic acid, sodium peroxoborate, performic acid, peracetic acid, hypochlorous acid, sodium hypochlorite, and calcium hypochlorite. Among these compounds, hydrogen peroxide, persulfuric acid and a salt thereof, hypochlorous acid and a salt thereof, and the like are preferable, and hydrogen peroxide is more preferable.

The content of an oxidizer in the polishing composition is preferably from 0.01 to 10.0% by mass. The content is more preferably from 0.1 to 5.0% by mass.

(6) Other Components

According to at least one embodiment, the polishing composition can further contain a surfactant having a repeating unit and a sulfonic acid (salt) group in a molecule thereof and having an aromatic group in a main chain of the repeating unit.

Specific examples of the surfactant include a naphthalenesulfonic acid compound such as a naphthalenesulfonic acid formaldehyde condensate or a methylnaphthalenesulfonic acid formaldehyde condensate, a melamine formalin resin sulfonic acid compound such as a melamine sulfonic acid formaldehyde condensate, a ligninsulfonic acid compound such as ligninsulfonic acid or modified ligninsulfonic acid, an aromatic aminosulfonic acid compound such as aminoarylsulfonic acid-phenol-formaldehyde condensate, and salts thereof. Among these compounds, a naphthalenesulfonic acid compound, a ligninsulfonic acid compound, an aromatic aminosulfonic acid compound, and salts thereof are preferable.

Examples of a counter ion for a salt thereof include an alkali metal salt of sodium, potassium, or the like, an alkaline earth metal salt of calcium or the like, an ammonium salt, a primary amine salt such as monoethanol amine, a secondary amine salt such as diethanol amine, a tertiary amine salt such as triethanol amine, and a quaternary ammonium salt such as tetramethyl ammonium.

Examples of the naphthalenesulfonic acid compound, the ligninsulfonic acid compound, and the aromatic aminosulfonic acid compound, and salts thereof include an acid and an alkali metal salt of sodium, potassium, or the like, an alkaline earth metal salt of calcium or the like, an ammonium salt, a primary amine salt such as monoethanol amine, a secondary amine salt such as diethanol amine, a tertiary amine salt such as triethanol amine, and a quaternary ammonium salt such as tetramethyl ammonium, as described above.

Among these compounds, a salt of a naphthalenesulfonic acid compound is preferable, and a sodium naphthalenesulfonate formaldehyde condensate, a sodium methylnaphthalenesulfonate formaldehyde condensate, and the like are preferably used.

The content of the surfactant in the polishing composition is preferably 0.0001% by mass or more and 2% by mass or less, and more preferably 0.001% by mass or more and 1% by mass or less.

2. Physical Properties

The pH value (25° C.) of the polishing composition according to at least one embodiment is preferably from 0.1 to 4.0. The pH value (25° C.) is more preferably from 0.5 to 3.0. The pH value (25° C.) of the polishing composition of 0.1 or more can suppress deterioration of surface smoothness. The pH value (25° C.) of the polishing composition of 4.0 or less can suppress lowering of a polishing rate.

The polishing composition according to at least one embodiment can be used for polishing various electronic components such as a magnetic recording medium including a hard disc. Particularly, the polishing composition according to at least one embodiment can be used preferably for polishing an aluminum magnetic disc substrate. The polishing composition according to at least one embodiment can be more preferably used for polishing an electroless nickel-phosphorus plated aluminum magnetic disc substrate. Electroless nickel-phosphorus plating is usually performed at a pH value (25° C.) of 4 to 6. Nickel tends to be dissolved at a pH value (25° C.) of 4 or less, and therefore plating does not proceed easily. Meanwhile, in polishing, for example, nickel tends to be dissolved at a pH value (25° C.) of 4.0 or less, and therefore use of the polishing composition according to at least one embodiment can increase a polishing rate.

3. Method for Polishing Magnetic Disc Substrate

The polishing composition according to at least one embodiment is suitable for use in polishing a magnetic disc substrate such as an aluminum magnetic disc substrate or a glass magnetic disc substrate. Particularly, the polishing composition according to at least one embodiment is suitable for use in finish polishing of an electroless nickel-phosphorus plated aluminum magnetic disc substrate.

Examples of a method to which the polishing composition according to at least one embodiment can be applied include a method for pasting a polishing pad on a surface plate of a polishing machine, supplying a polishing composition to a surface to be polished in the polishing target or the polishing pad, and rubbing the surface to be polished with the polishing pad. For example, when front and back surfaces of an aluminum magnetic disc substrate are polished simultaneously, a double-side polishing machine in which polishing pads are pasted on an upper surface plate and a lower surface plate can be used. In this method, an aluminum magnetic disc substrate is sandwiched by polishing pads pasted on an upper surface plate and a lower surface plate, a polishing composition is supplied between a polishing surface and each of the polishing pads, the two polishing pads are rotated simultaneously, and front and back surfaces of the aluminum magnetic disc substrate are thereby polished.

A urethane type, suede type, nonwoven fabric type, or any other type polishing pad can be used.

EXAMPLES

Hereinafter, various embodiments will be described in more detail based on Examples, but the various embodiments are not limited to the Examples.

In polishing in the following Examples and Comparative Examples, 100 electroless nickel-phosphorus plated aluminum alloy substrates which had been coarsely polished in advance were prepared, and were subjected to finish polishing continuously from the first substrate to the hundredth substrate. Table 2 indicates evaluation results for a polishing rate and a scratch after the tenth, fiftieth, and hundredth substrates were subjected to finish polishing in this continuous finish polishing. Transition of the polishing rate and the scratch in a finish polishing step was compared among Examples and Comparative Examples. Hereinafter, specific description will be given.

Method for Preparing Polishing Composition

Polishing compositions used in Examples 1 to 8 and Comparative Examples 1 to 6 contain materials indicated in Table 1 in the contents or addition amounts indicated in Table 1.

TABLE 1

| material | content | use |
| --- | --- | --- |
| colloidal silica I (average particle size (D50): 21 nm) | 5.6% by mass | Examples 1, 3, 5, and 7 Comparative Examples 1, 3, and 5 |
| colloidal silica II (average particle size (D50): 29 nm) | 5.6% by mass | Examples 2, 4, 6, and 8 Comparative Examples 2, 4, and 6 |
| phosphoric acid | 1.4% by mass | Examples 1 to 8 Comparative Examples 1 to 4 |
| sulfuric acid | 0.4% by mass | Comparative Examples 5 and 6 |
| 1-hydroxyethylidene-1,1-diphosphonic acid (HEDP, organic phosphonic acid) | 0.2% by mass | Examples 5, 6, 7, and 8 |
| hydrogen peroxide | 0.6% by mass | Examples 1 to 8 Comparative Examples 1 to 6 |
| acrylic polymer A (copolymer of acrylic acid/N-tert-butylacrylamide = 86/14 (molar ratio), weight average molecular weight = 6,000) | 0.04% by mass | Examples 1, 2, 5, 6, 7, and 8 Comparative Examples 5 and 6 |
| acrylic polymer B (copolymer of acrylic acid/N-tert-butylacrylamide = 86/14 (molar ratio), weight average molecular weight = 8,000) | 0.04% by mass | Examples 3 and 4 |
| acrylic polymer C (sodium polyacrylate, weight average molecular weight = 6,000) | 0.04% by mass | Comparative Examples 3 and 4 |
| sodium naphthalenesulfonate formaldehyde condensate manufactured by DKS Co., Ltd., Raberin FM-45, surfactant) | 0.02% by mass | Examples 7 and 8 |

Colloidal silica I is a commercially available product having an average particle size (D50) of 21 nm. Colloidal silica II is a commercially available product having an average particle size (D50) of 29 nm.

Phosphoric acid was contained in an amount of 1.4% by mass such that the pH (25° C.) of the entire polishing composition was 1.6. Sulfuric acid was contained in an amount of 0.4% by mass such that the pH (25° C.) of the entire polishing composition was 1.6.

1-hydroxyethylidene-1,1-diphosphonic acid is an organic phosphonic acid, and is abbreviated as HEDP below. Hydrogen peroxide was used as an oxidizer.

Acrylic polymer A is a copolymer of acrylic acid/N-tert-butylacrylamide=86/14 (molar ratio), and had a weight average molecular weight of 6,000. The pH value (25° C.) of a 10% by mass acrylic polymer A aqueous solution is usually 3.6. Acrylic polymer B is a copolymer of acrylic acid/N-tert-butylacrylamide=86/14 (molar ratio), and had a weight average molecular weight of 8,000. The pH value (25° C.) of a 10% by mass acrylic polymer B aqueous solution is usually 3.6. Acrylic polymer C is a sodium polyacrylate, and had a weight average molecular weight of 6,000. The pH value (25° C.) of a 10% by mass acrylic polymer C aqueous solution is usually 7.0. Acrylic polymers A and B are each a copolymer having a structural unit derived from an unsaturated aliphatic carboxylic acid and a structural unit derived from an unsaturated amide. Acrylic polymer C is a homopolymer of acrylic acid (salt).

A sodium naphthalenesulfonate formaldehyde condensate Raberin FM-45 (manufactured by DKS Co., Ltd.) was used as a surfactant.

Particle Size of Colloidal Silica

The particle size (Heywood diameter) of colloidal silica was measured as a Heywood diameter (projected area equivalent circular diameter) by taking a photograph in a visual field at a magnitude of 100,000 with a transmission electron microscope (TEM) (manufactured by JEOL Ltd., transmission electron microscope JEM2000FX (200 kV)) and analyzing the photograph using an analysis software (manufactured by Mountech Co., Ltd., Mac-View Ver. 4.0). The average particle size of colloidal silica is an average particle size (D50) obtained by analyzing particle sizes of about 2000 particles of colloidal silica by the above method and calculating a particle size having 50% of an accumulated particle size distribution (based on accumulated volume) from a small particle size side using the above analysis software (manufactured by Mountech Co., Ltd., Mac-View Ver. 4.0).

Polishing Conditions

An electroless nickel-phosphorus plated aluminum magnetic disc substrate having an outer diameter of 95 mm was rough polished, and the resulting product was polished as a polishing target.

polishing machine: manufactured by SpeedFam Company Limited, 9B double-side polishing machine polishing pad: manufactured by FILWEL Co., Ltd., pad for P2 surface plate rotating speed: upper surface plate $-8.3$ min$^{-1}$, lower surface plate 25.0 min$^{-1}$ feed of polishing composition: 100 ml/min polishing time: 300 seconds processing pressure: 11 kPa Components were mixed to prepare a polishing composition. Thereafter, the polishing composition was introduced into a polishing machine through a filter having an opening of 0.45 μm, and was subjected to a polishing test.

Evaluation of Disk Surface Polished

Polishing Rate Ratio

The mass of an aluminum magnetic disc substrate, reduced after polishing was measured, and a polishing rate was calculated based on the following formula.

polishing rate (μm/min)=reduction in mass of aluminum magnetic disc substrate (g)/polishing time (min)/area of one surface of aluminum magnetic disc substrate (cm$^2$)/density of electroless nickel-phosphorus plated film (g/cm$^3$)/2×10$^4$ (in the above formula, area of one surface of aluminum magnetic disc substrate=65.9 cm$^2$, density of electroless nickel-phosphorus plated film=8.0 g/cm$^3$)

A polishing rate ratio is a relative value in a case where a polishing rate determined using the above formula when the tenth substrate is polished in Comparative Example 3 is assumed to be 1 (base). Note that the polishing rate when the tenth substrate was polished in Comparative Example 3 was 0.0985 μm/min.

Scratch Ratio

The number of scratches on a substrate was measured using MicroMAX VMX-4100 manufactured by Vision Psytech, Ltd. under a measurement condition of a tilt angle of $-5°$ and a magnitude of 20. The scratch ratio is a relative value in a case where the number of scratches when the tenth substrate is polished in Comparative Example 3 is assumed to be 1 (base).

Filter Replacement Frequency

Each of polishing compositions was prepared in an amount of 600 liters, and was continuously caused to pass through a filter having an opening of 0.45 μm for 100 hours. When a difference pressure of a filter cartridge was increased to 0.2 MPa, the filter was replaced with a new filter. Table 2 indicates the filter replacement frequency for each polishing composition. The smaller frequency indicates that filter clogging is less likely to occur. That is, the smaller filter exchange number indicates that aggregation of colloidal silica could be suppressed.

TABLE 2

| Experimental number | colloidal silica | | acid | phosphorus-containing compound | water-soluble polymer compound | Raberin FM-45 concentration (% by mass) |
|---|---|---|---|---|---|---|
| | average particle size D50 (nm) | concentration (% by mass) | | | | |
| Example 1 | 21 | 5.6 | none | phosphoric acid | acrylic polymer A | 0 |
| Example 2 | 29 | 5.6 | none | phosphoric acid | acrylic polymer A | 0 |
| Example 3 | 21 | 5.6 | none | phosphoric acid | acrylic polymer B | 0 |

TABLE 2-continued

| | | | | | | |
|---|---|---|---|---|---|---|
| Example 4 | 29 | 5.6 | none | phosphoric acid | acrylic polymer B | 0 |
| Example 5 | 21 | 5.6 | none | phosphoric acid + HEDP | acrylic polymer A | 0 |
| Example 6 | 29 | 5.6 | none | phosphoric acid + HEDP | acrylic polymer A | 0 |
| Example 7 | 21 | 5.6 | none | phosphoric acid + HEDP | acrylic polymer A | 0.02 |
| Example 8 | 29 | 5.6 | none | phosphoric acid + HEDP | acrylic polymer A | 0.02 |
| Comparative Example 1 | 21 | 5.6 | none | phosphoric acid | none | 0 |
| Comparative Example 2 | 29 | 5.6 | none | phosphoric acid | none | 0 |
| Comparative Example 3 | 21 | 5.6 | none | phosphoric acid | acrylic polymer C | 0 |
| Comparative Example 4 | 29 | 5.6 | none | phosphoric acid | acrylic polymer C | 0 |
| Comparative Example 5 | 21 | 5.6 | sulfuric acid | none | acrylic polymer A | 0 |
| Comparative Example 6 | 29 | 5.6 | sulfuric acid | none | acrylic polymer A | 0 |

| Experimental number | pH (25° C.) | polishing rate ratio (with respect to Comparative Example 3) | | | scratch ratio (with respect to Comparative Example 3) | | | filter replacement frequency |
|---|---|---|---|---|---|---|---|---|
| | | tenth | fiftieth | hundredth | tenth | fiftieth | hundredth | |
| Example 1 | 1.6 | 1.07 | 0.93 | 0.90 | 0.64 | 0.64 | 0.65 | 1 |
| Example 2 | 1.6 | 1.17 | 0.99 | 0.96 | 0.70 | 0.68 | 0.74 | 1 |
| Example 3 | 1.6 | 1.08 | 0.87 | 0.84 | 0.53 | 0.68 | 0.50 | 1 |
| Example 4 | 1.6 | 1.13 | 0.90 | 0.92 | 0.55 | 0.59 | 0.58 | 1 |
| Example 5 | 1.6 | 1.17 | 1.00 | 0.98 | 0.64 | 0.58 | 0.58 | 0 |
| Example 6 | 1.6 | 1.22 | 1.07 | 1.04 | 0.64 | 0.59 | 0.54 | 0 |
| Example 7 | 1.6 | 1.13 | 0.98 | 0.96 | 0.27 | 0.29 | 0.23 | 0 |
| Example 8 | 1.6 | 1.20 | 1.06 | 1.05 | 0.33 | 0.34 | 0.30 | 0 |
| Comparative Example 1 | 1.6 | 0.91 | 0.71 | 0.59 | 0.67 | 0.70 | 0.77 | 1 |
| Comparative Example 2 | 1.6 | 0.99 | 0.77 | 0.65 | 0.79 | 0.77 | 0.82 | 1 |
| Comparative Example 3 | 1.6 | 1 | 0.89 | 0.84 | 1 | 1.05 | 1.02 | 1 |
| Comparative Example 4 | 1.6 | 1.06 | 0.93 | 0.88 | 1.11 | 1.00 | 1.20 | 1 |
| Comparative Example 5 | 1.6 | 0.89 | 0.74 | 0.72 | 0.83 | 0.84 | 0.88 | 4 |
| Comparative Example 6 | 1.6 | 0.94 | 0.81 | 0.78 | 0.90 | 0.89 | 0.95 | 4 |

Discussion

From comparison between Comparative Examples 1 and 3 and between Comparative Examples 2 and 4, it is found that a polishing rate is increased but scratches are poorer due to addition of a homopolymer of acrylic acid (salt) (acrylic polymer C).

Meanwhile, from comparison between Example 1 and Comparative Example 1 and between Example 2 and Comparative Example 2, it is found that not only an initial polishing rate is increased but also lowering of a polishing rate after polishing many times is suppressed, and scratches are also improved in a case of addition of a copolymer of acrylic acid (salt) and an unsaturated amide (acrylic polymer A).

Polishing compositions in Examples 3 and 4 (acrylic polymer B) were obtained by increasing a weight average molecular weight of a copolymer of acrylic acid (salt) and an unsaturated amide in Examples 1 and 2. In Examples 3 and 4, a scratch improvement effect is more remarkable.

It is found that the polishing rate is further increased and scratches are further improved by further adding an organic phosphonic acid (salt) (HEDP) to Examples 1 and 2 (from comparison between Examples 5 and 1 and between Examples 6 and 2).

Polishing compositions in Examples 7 and 8 were obtained by adding a naphthalenesulfonic acid compound (salt) (Raberin FM-45) to polishing compositions in Examples 5 and 6 in order to improve scratches. It is found that scratches are largely improved as compared to those before addition of the naphthalenesulfonic acid compound (salt).

From comparison between Example 1 and Comparative Example 5 and between Example 2 and Comparative Example 6, it is found that a polishing rate is higher, scratches are better, and clogging of a filter can be improved by presence of a phosphorus-containing compound.

From the above, it is found that clogging of a filter can be improved, scratches after polishing can be reduced, and lowering of a polishing rate after polishing many times can be suppressed by using the polishing composition according to at least one embodiment.

The polishing composition according to at least one embodiment can be used for polishing an electronic component such as a semiconductor or a magnetic recording medium including a hard disc. Particularly, the polishing composition according to at least one embodiment can be used for polishing a surface of a substrate for a magnetic recording medium such as a glass magnetic disc substrate or an aluminum magnetic disc substrate. Furthermore, the polishing composition according to at least one embodiment can be used for finish polishing of an aluminum magnetic disc substrate for a magnetic recording medium, having an electroless nickel-phosphorus plated film formed on a surface of an aluminum alloy substrate.

What is claimed is:

1. A polishing composition for a magnetic disk substrate, comprising:
    colloidal silica;
    a phosphorus-containing compound;
    a water-soluble polymer compound; and
    water,
    wherein the water-soluble polymer compound is a copolymer containing a structural unit derived from an unsaturated aliphatic carboxylic acid and a structural unit derived from an unsaturated amide, and
    wherein the unsaturated amide is N-alkylacrylamide or N-alkylmethacrylamide.

2. The polishing composition for a magnetic disc substrate according to claim 1, wherein the colloidal silica has an average particle size (D50) of 1 to 100 nm and a concentration of 1 to 50% by mass in the composition.

3. The polishing composition for a magnetic disc substrate according to claim 1, wherein the water-soluble polymer compound is a copolymer having a molar ratio of 95:5 to 5:95 between the structural unit derived from an unsaturated aliphatic carboxylic acid and the structural unit derived from an unsaturated amide.

4. The polishing composition for the magnetic disk substrate according to claim 3, wherein the unsaturated aliphatic carboxylic acid is selected from the group consisting of acrylic acid, methacrylic acid, and salts thereof.

5. The polishing composition for a magnetic disc substrate according to claim 1, wherein the water-soluble polymer compound has a weight average molecular weight of 500 to 50,000.

6. The polishing composition for a magnetic disc substrate according to claim 1, wherein the water-soluble polymer compound has a concentration of 0.0001 to 2.0% by mass.

7. The polishing composition for a magnetic disc substrate according to claim 1, wherein the phosphorus-containing compound is at least one selected from the group consisting of an inorganic phosphorus compound and an organic phosphonic acid and/or a salt thereof.

8. The polishing composition for a magnetic disc substrate according to claim 7, wherein the inorganic phosphorus compound is at least one selected from the group consisting of phosphoric acid, phosphonic acid, phosphinic acid, pyrophosphoric acid, tripolyphosphoric acid, and salts thereof.

9. The polishing composition for a magnetic disc substrate according to claim 7, wherein the organic phosphonic acid and/or a salt thereof is at least one selected from the group consisting of 2-aminoethyl phosphonic acid, 1-hydroxyethylidene-1,1-diphosphonic acid, aminotri(methylene phosphonic acid), ethylene diaminetetra(methylene phosphonic acid), diethylene triaminepenta(methylene phosphonic acid), ethane-1,1-diphosphonic acid, ethane-1,1,2-triphosphonic acid, ethane-1-hydroxy-1,1,2-triphosphonic acid, ethane-1,2-dicarboxy-1,2-diphosphonic acid, methanehydroxy phosphonic acid, 2-phosphonobutane-1,2-dicarboxylic acid, 1-phosphonobutane-2,3,4-tricarboxylic acid, α-methyl phosphono succinic acid, and salts thereof.

10. The polishing composition for a magnetic disk substrate according to claim 1, further comprising:
    a surfactant having a repeating unit and at least one of a sulfonic acid and a sulfonate group in a molecule thereof and having an aromatic group in a main chain of the repeating unit.

11. The polishing composition for a magnetic disc substrate according to claim 10, wherein the surfactant contains at least one selected from the group consisting of a naphthalenesulfonic acid compound, a ligninsulfonic acid compound, an aromatic aminosulfonic acid compound, and salts thereof.

12. The polishing composition for a magnetic disc substrate according to claim 11, wherein the naphthalenesulfonic acid compound is at least one selected from the group consisting of a naphthalenesulfonic acid formaldehyde condensate, a methyl naphthalenesulfonic acid formaldehyde condensate, and salts thereof.

* * * * *